(12) United States Patent
Engelien-Lopes et al.

(10) Patent No.: US 9,847,809 B2
(45) Date of Patent: Dec. 19, 2017

(54) USING MULTIPLE CORRELATORS TO DETERMINE SIGNAL SENT AND FREQUENCY OFFSET

(71) Applicant: Nordic Semiconductor ASA, Trondheim (NO)

(72) Inventors: David Alexandre Engelien-Lopes, Trondheim (NO); Sverre Wichlund, Trondheim (NO); Phil Corbishley, Oxfordshire (GB)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 15/106,141

(22) PCT Filed: Dec. 10, 2014

(86) PCT No.: PCT/GB2014/053649
§ 371 (c)(1),
(2) Date: Jun. 17, 2016

(87) PCT Pub. No.: WO2015/092365
PCT Pub. Date: Jun. 25, 2015

(65) Prior Publication Data
US 2016/0315656 A1 Oct. 27, 2016

(30) Foreign Application Priority Data
Dec. 20, 2013 (GB) .................................. 1322682.4

(51) Int. Cl.
*H03D 1/00* (2006.01)
*H04L 27/06* (2006.01)
(Continued)

(52) U.S. Cl.
CPC ......... *H04B 1/7087* (2013.01); *H04B 17/336* (2015.01); *H04L 5/006* (2013.01);
(Continued)

(58) Field of Classification Search
CPC H04B 1/7087; H04B 17/336; H04B 2201/69; H04L 27/0014; H04L 27/227;
(Continued)

(56) References Cited

U.S. PATENT DOCUMENTS 7,233,632 B1 * 6/2007 Kingston .............. H04L 7/0054
329/307
7,634,033 B1 12/2009 Giallorenzi et al.
(Continued)

FOREIGN PATENT DOCUMENTS

| EP | 2 467 984 B1 | 3/2013 |
|---|---|---|
| WO | WO89/04095 | 5/1989 |
| WO | WO02/25830 | 3/2002 |

OTHER PUBLICATIONS

GB1322682.4, Search Report Under Section 17(5), U.K. Intellectual Property Office, dated Jun. 13, 2014, 3 pages.
(Continued)

*Primary Examiner* — Phuong Phu
(74) *Attorney, Agent, or Firm* — Klarquist Sparkman LLP

(57) ABSTRACT

A digital radio receiver is adapted to receive radio signals modulated using continuous phase modulation. The receiver includes components for receiving analogue radio signals having various carrier frequencies and a plurality of correlators corresponding to different bit sequences. Each of the plurality of correlators share a common estimator for estimating a frequency offset between the radio signals carrier frequencies and nominal carrier frequencies. The receiver further includes components allowing the estimator to determine which of the correlators produce the most optimal output signal.

24 Claims, 4 Drawing Sheets

Figure 1:
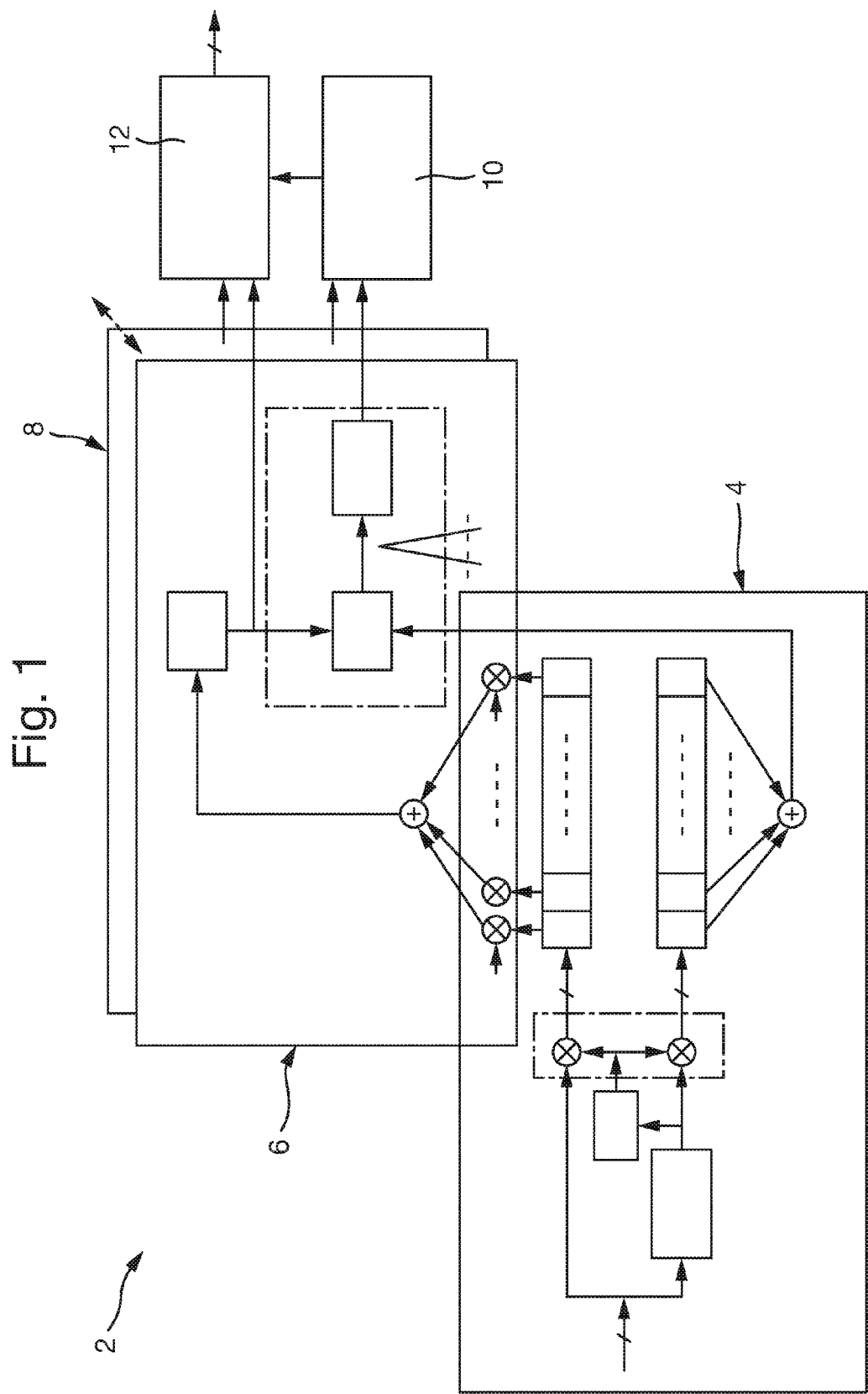

(51) Int. Cl.
*H04B 1/7087* (2011.01)
*H04L 27/00* (2006.01)
*H04L 27/227* (2006.01)
*H04B 17/336* (2015.01)
*H04L 5/00* (2006.01)
*H04W 4/00* (2009.01)

(52) U.S. Cl.
CPC ........ *H04L 27/0014* (2013.01); *H04L 27/227* (2013.01); *H04W 4/008* (2013.01); *H04B 2201/69* (2013.01); *H04L 2027/0026* (2013.01); *H04L 2027/0034* (2013.01); *H04L 2027/0046* (2013.01)

(58) Field of Classification Search
CPC ..... H04L 2027/0026; H04L 2027/0034; H04L 2027/0046; H04L 5/006; H04W 4/008
USPC ....... 375/142, 143, 149, 150, 152, 343, 362, 375/365
See application file for complete search history.

(56) References Cited

U.S. PATENT DOCUMENTS

| | | | |
|---|---|---|---|
| 8,014,379 B2 | 9/2011 | Capretta et al. | |
| 8,849,226 B2* | 9/2014 | Bruchner | H04B 1/40 370/252 |
| 2006/0222114 A1 | 10/2006 | Lee et al. | |
| 2007/0002937 A1* | 1/2007 | Min | H04B 1/708 375/150 |
| 2008/0205492 A1 | 8/2008 | Gorday et al. | |
| 2009/0310653 A1 | 12/2009 | Gorday | |
| 2010/0040117 A1 | 2/2010 | Lawrow | |

OTHER PUBLICATIONS

PCT/GB2014/053649, International Search Report and Written Opinion, International Searching Authority, European Patent Office, dated Mar. 31, 2015, 11 pages.
Der, "Frequency Modulation (FM) Tutorial," Silicon Laboratories, Inc., undated, 11 pages.
Meyr et al., "Digital Communication Receivers: Synchronization, Channel Estimation and Signal Processing," John Wiley & Sons, Inc., 1998, pp. 486-489.
Pozar, "Microwave and RF Design of Wireless Systems," John Wiley & Sons, 2001, pp. 298-303.
Proakis et al., "Digital Communications—5$^{th}$ Edition," Chapter 12, McGraw Hill, 2008, pp. 762-802.
International Preliminary Report on Patentability for PCT/GB2014/053649, dated Jun. 21, 2016, 7 pages.

* cited by examiner

| Preamble | Access Address | PDU | CRC |
|---|---|---|---|
| 1 octet<br>10101010 | 4 octets<br>0x8E89BED6 | 2 to 39 octets | 8 octets |

USING MULTIPLE CORRELATORS TO DETERMINE SIGNAL SENT AND FREQUENCY OFFSET

CROSS REFERENCE TO RELATED APPLICATIONS

This is the U.S. National Stage of International Application No. PCT/GB2014/053649, filed Dec. 10, 2014, which was published in English under PCT Article 21(2), which in turn claims the benefit of Great Britain Application No. 1322682.4, filed Dec. 20, 2013, all of which are incorporated herein in their entirety.

This invention relates to apparatus and methods for decoding digital radio transmissions.

In portable devices, there is a general requirement to reduce power consumption. This requirement extends to the power used for methods of communication, which can limit the range over which communication can efficiently take place.

Although many different communication protocols exist, e.g. Bluetooth, Zigbee, there are common constraints on their performance. In particular, signals become susceptible to noise, particularly in long range transmissions as the signal is attenuated with distance. This leads to bit and packet errors when data is not accurately received. One way of making a signal less affected by noise is of course to increase the power of transmission, as this increases the signal-to-noise ratio. However, this is inconsistent with efforts to reduce power consumption, and the two requirements must be balanced.

One possible method for improving transmission quality in a digital system is to use spread spectrum modulation whereby each bit or sequence of bits is represented in a transmission by a number of chips. This reduces the impact of losing a single chip, as it does not represent a whole bit and if the chip sequences are chosen carefully they can still be distinguished even if some chips are missing. However, while this may help to increase range under ideal conditions, it may fail in the presence of carrier frequency offset or drift. These create problems when a signal is received, potentially causing data to be misread.

When viewed from a first aspect, the present invention provides a digital radio receiver adapted to receive radio signals modulated using continuous phase modulation, the receiver comprising means for receiving an analogue radio signal having a carrier frequency, a plurality of correlators each corresponding to a different bit sequence sharing a common estimator for estimating a frequency offset between said carrier frequency and a nominal carrier frequency, and means for determining which of said correlators produces a desired output signal.

As will be appreciated by those skilled in the art in light of the disclosure herein, a digital receiver is provided which may give improved sensitivity in the presence of carrier frequency offset, due to the use of a plurality of correlators. As will be familiar to those skilled in the art, the correlators may be used to compute a cross-correlation between an incoming waveform and a known waveform which represents a desired pattern in the data packet. The use of a plurality of correlators is particularly beneficial for a number of reasons. Correlators are able to operate relatively fast since it is not necessary to carry out a search or learning type of operation. In addition, the correlators can provide estimates of timing and frequency offset, allowing rapid timing synchronization to be achieved which is advantageous in applications such as Bluetooth where there is limited time allowed in the protocol for synchronization. In addition, a valid 'peak' at a correlator output can also act as valid packet (frame) synchronization. Finally, it has been found that a suitably designed correlator may work satisfactorily under low signal-to-noise ratios (SNRs), i.e. the correlator does not become a limiting factor.

The use of a plurality of correlators allows for low energy transmissions to be carried out over a longer range, as the receiver is more readily able to determine bit patterns. By comparing the output from a plurality of correlators, the value of each bit can easily and rapidly be determined, as each correlator is only looking for a single bit pattern, rather than needing to carry out a plurality of comparisons to different bit patterns. The correlator outputs can then be compared in order to choose the relevant one, and therefore to find the correct bit pattern. By carrying out a number of direct comparisons with known values, degradation of the signal becomes less important, because a relative signal is desired (e.g. the highest output), rather than a specific absolute value. In a set of embodiments, the desired output signal is the highest output signal.

The bit sequences associated with correlators could be direct bit sequences, but in a set of embodiments the bit sequences to which the correlators correspond comprise chip sequences in a Direct Sequence Spread Spectrum (DSSS) scheme, i.e. the radio signal comprises at least in part a direct-sequence spread spectrum signal. In DSSS some or all original bits in a packet are split up (or 'spread') into a sequence of chips, such that each such original bit is represented by a sequence.

There may only be two sequences, one representing 1 and another representing 0, for example each '1' bit could be represented by the sequence '1101' and each '0' bit by '0010'. Alternatively there may be larger numbers of sequences, e.g. for longer bit patterns. Of course different sequences could be used, particularly different length sequences could be used. Each of the correlators may therefore be associated with a particular sequence of chips, with the correlator which produces a desired output signal being the one which represents the appropriate bit or bit sequence. The entire packet may be sequences of chips, but in a set of embodiments, only part of the packet e.g. the payload, is split up into chips. Thus each 'bit' as referred to in accordance with the invention could be a direct bit, or could be a chip following signal spreading.

By using sequences of chips, the quality of the received signal can be improved. This is because each original bit is spread out over a number of chips. For a entire packet transmission, a certain number of chips may be lost between the transmitter and receiver. The advantage of this is that it is easier to recover the represented original bit even if some of the actual bits (chips) transmitted are not received or recovered reliably. This means that a bit error rate (BER) specified for a device can be achieved for represented original bits whilst the BER for 'over-the-air' bits is much higher. In practical terms this means that for a given transmission power and receiver gain, a connection that is otherwise in accordance with the protocol may extend over a greater distance than without the coding scheme being applied. Such operation can therefore be considered a long range mode. By having chip sequences that are very different, e.g. orthogonal to one another, a partial transmission can still be easily distinguished from the other sequences.

As will be appreciated by those skilled in the art representing each data bit by a plurality of chips reduces the effective data rate which can be achieved. More specifically where each data bit is represented by a fixed length sequence, the effective data rate is the chip rate divided by the sequence length. There is thus a trade-off between sequence length and data rate. On the other hand the longer the sequence used, the greater the range which can be achieved for a given data BER as longer sequences give greater tolerance to dropped chips.

In a set of embodiments, the common estimator is a data-aided joint timing and frequency offset estimator. This known estimator is used with a plurality of correlators, in order to represent a plurality of bit or chip sequences. By using a common estimator, the correlators are all using the same timing information, and therefore are easier to synchronise.

In a further set of embodiments, the common estimator is used for both despreading of the signal and for synchronisation of the correlators with the incoming signal. This removes the need for separate modules for both despreading (i.e. rebuilding bits from chips) and synchronisation, reducing both the size of the receiver and the cost of manufacturing. A standard Bluetooth preamble may suffice where each preamble bit is replaced with a corresponding chip sequence. This removes the need for longer preambles as are frequently used in spread spectrum schemes. By using the same module for both despreading and synchronisation, the resulting data is more robust to carrier frequency offset over the range of the frequency estimator as each correlator is essentially a frequency offset estimator. The tolerance of the system to carrier frequency offset is given by the range of the estimator, which is controllable via the differential delay in the differential filter in front of the correlator.

In a set of embodiments the digital radio receiver is arranged to record a timestamp when a desired output signal is measured, and the next time said signal is measured, perform a check that a predetermined number of samples have been taken since the previous signal was measured. This may be used to prevent spurious data affecting the transmissions, as the receiver knows when to expect the next signal, within a certain error tolerance.

This invention extends to a method of operating a digital radio receiver comprising:
  receiving an analogue radio signal having a carrier frequency, which is modulated using continuous phase modulation;
  using a plurality of correlators each corresponding to a different bit sequence sharing a common estimator;
  estimating a frequency offset between said carrier frequency and a nominal carrier frequency using the common estimator; and
  determining which of said correlators produces a desired output signal.

This invention further extends to computer software for operating a digital radio receiver adapted to:
  receive an analogue radio signal having a carrier frequency, which is modulated using continuous phase modulation;
  use a plurality of correlators each corresponding to a different bit sequence sharing a common estimator;
  estimate a frequency offset between said carrier frequency and a nominal carrier frequency using the common estimator; and
  determine which of said correlators produces a desired output signal.

Figure 2:
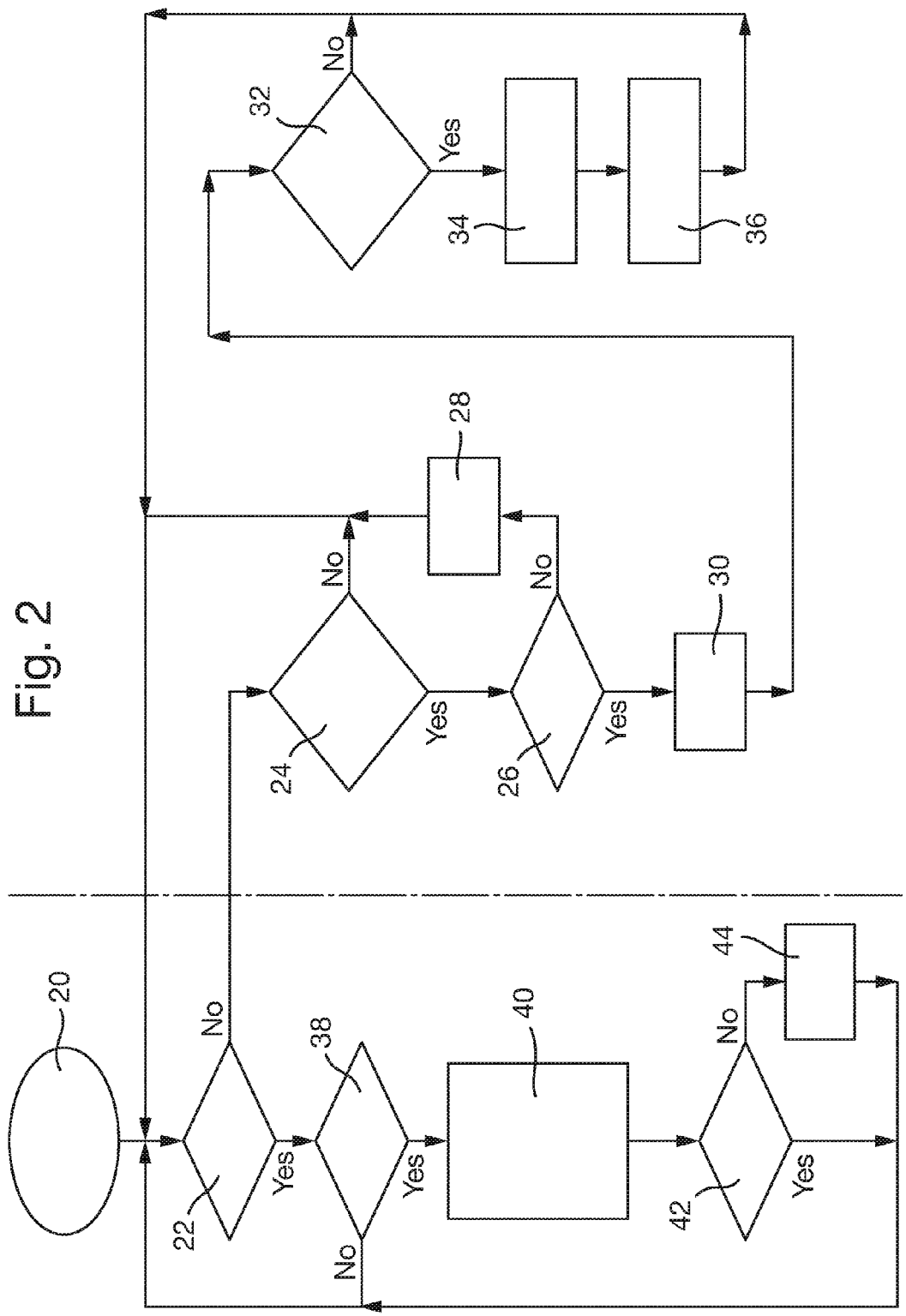
Figure 3:
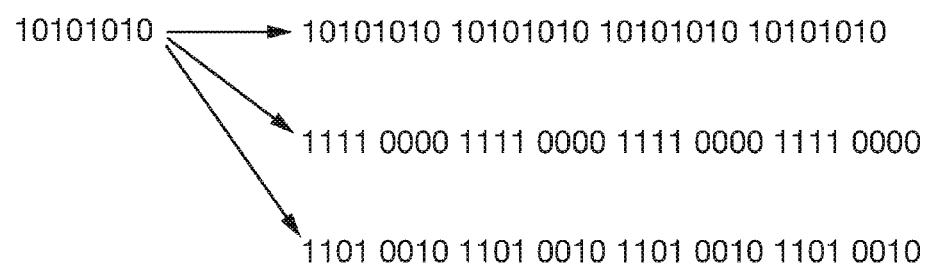
Figure 4:
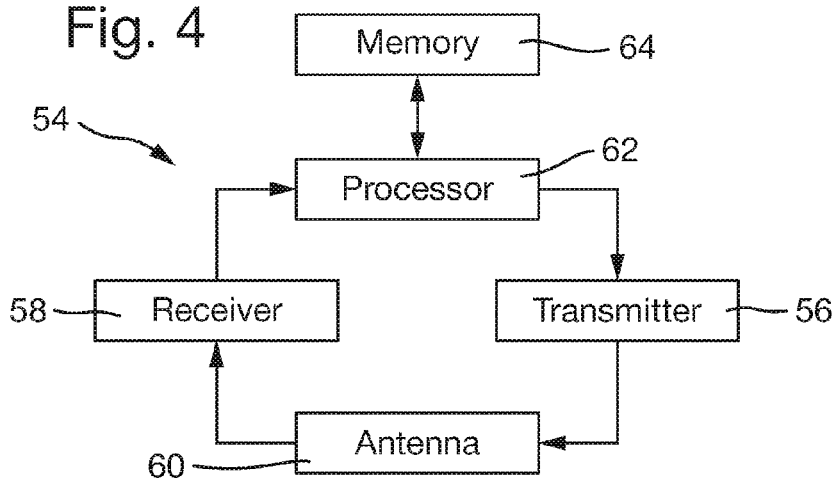
Figure 5:
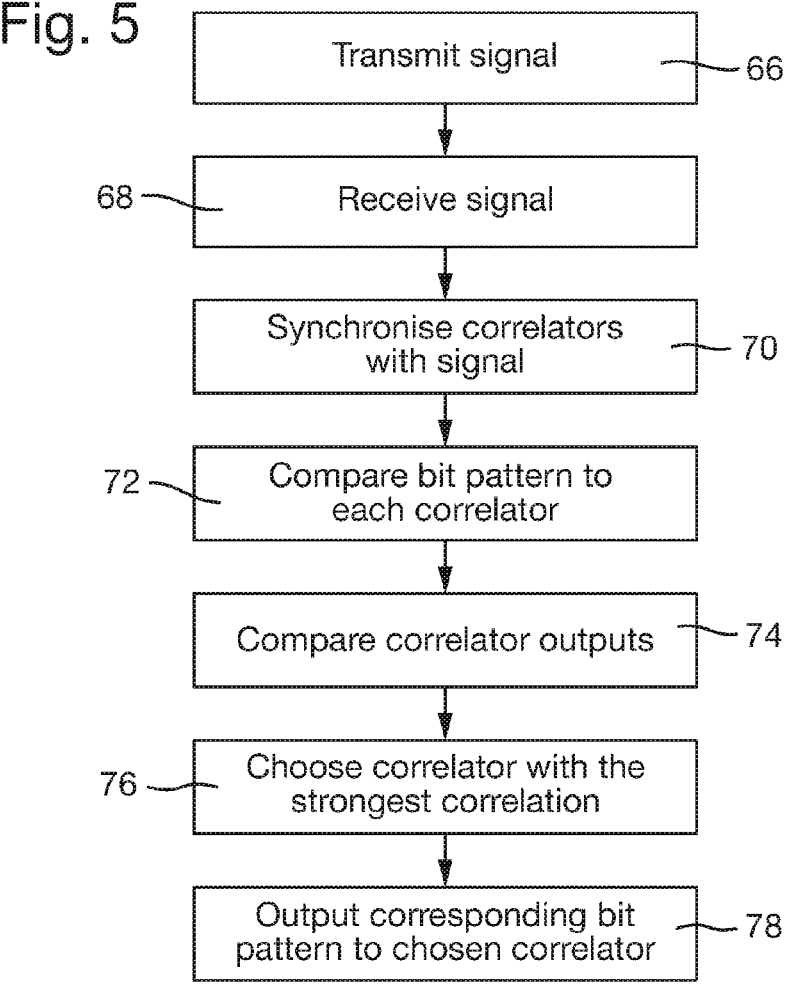

An embodiment of the invention will now be described, by way of example only, with reference to the accompanying drawings in which:
  FIG. 1 shows a schematic diagram of processor for a digital receiver in accordance with the invention;
  FIG. 2 shows a flowchart of the operation of a receiver including the processor in FIG. 1;
  FIG. 3 shows a representation of a packet structure and possible coding schemes which may be applied;
  FIG. 4 shows an overview of a device in accordance with the invention; and
  FIG. 5 shows the overall operation of a device such as in FIG. 4.

FIG. 1 shows an exemplary processor 2 for a digital receiver in accordance with the invention. The processor 2 is made up primarily of an estimator 4 and a pair of correlators 6, 8. The correlators 6, 8 have the same physical set up, but are each associated with a different chip sequence. This is explained in more detail with reference to FIG. 2.

In this example there are two correlators, but in practice there could be more than two, depending on the number of sequences that need representing. The combination of the correlators 6, 8 and the estimator 4 forms a data-aided joint timing and frequency offset estimator.

In use, the common estimator 4 is used to synchronise the correlators 6, 8. The correlators 6, 8 are also synchronised with the incoming signal using the finite state machine (FSM) 10, which schedules sampling of the incoming signal such that samples are taken as appropriate for the bit patterns being received. As the incoming signal has been spread using direct sequence spread spectrum (DSSS) coding, each bit pattern is represented by a sequence of chips. These sequences may be as simple as to represent 1 and 0, as in this example with two correlators, or may represent longer bit patterns. When a sample is taken, the outputs of the two correlators are then input into a decision unit 12, in order to see which has a desired output signal. In this example, the desired output is the largest output signal indicating the strongest correlation. By passing the received signal through both of the correlators 6, 8, it is possible to tell which of the patterns being represented is closer to the chip sequence measured from the received signal. In this example, orthogonal chip sequences are used such that there is as large a difference between the two options as possible. Once a chip sequence has been established, the bit pattern being represented is output from the processor.

FIG. 2 shows a flow chart demonstrating how the processor described with reference to FIG. 1 could be operated. At step 20, the system is initialised to zero, ready for data acquisition. After the system state is tested at step 22, it proceeds to step 24, in which it is tested whether a peak is detected. This is carried out by seeing if a threshold value has been crossed by the output of any of the correlators 6, 8. If no peak is found, the system returns to step 22. However, if a peak is detected, the distance in time from the previous peak is measured. This measurement is made in order to prevent spurious noise impacting on the signal, as peaks should be determined at regular intervals. For example, in a system which uses sixteen chips to represent each bit, and has eight times oversampling, a peak would be expected every 128±1 samples. If the difference does not correspond to the expected number of samples, a measurement counter is set equal to one at step 28, before the system returns to step 22.

If the number of samples is within the predetermined accepted range, the counter is incremented (step 30) before the counter value is compared with a minimum (step 32). This minimum is in place to determine whether the system has synchronised properly yet, before it begins to read the information being sent. If the counter value is still below the minimum, it returns to step 22, in order to determine another peak. However, once it has reached the minimum value, the synchronisation state of the system can be set equal to one (step 34), as it is now deemed synchronised. This then allows the strobe timing of the system to be set (step 36), as the position of a minimum number of peaks (e.g. at least two) is already known.

When the system now returns to step 22, as the synchronisation state has changed the system can now record the payload. If the strobe timing is correct, as tested at step 38, when the next sample is taken, the output of the correlators can then be compared (step 40), in order to see which has the highest output. Once this has been recorded, a watchdog is run (step 42). This watchdog checks whether the system has synchronised in the middle of a chip sequence. If so, the synchronisation state is then returned to zero (step 44), as the system has not synchronised correctly. The system then returns to step 22, whether the synchronisation state is one or zero. The system will then either resynchronise, or continue to detect chip sequences and identify packets.

FIG. 3 shows a typical packet construction. The packet is divided into four separate fields of differing lengths. The first is the Preamble 46. This is made up of a single octet of alternating bits which may be used by the receiver for frequency recovery, timing recovery etc. Below the table are some examples of how a four times DSSS coding gain could be applied to the preamble '10101010', where a coding gain is the increase in ability to receive data to which a coding sequence has been applied. In the top example the original sequence is simply repeated four times. This is an exemplary preamble; alternative bit patterns could be used as the preamble. Thus a bit at position n in the original string is represented by four bits (or 'chips') in the extended sequence—namely those at positions n, n+8, n+16 and n+24 of the extended string.

In the centre example each bit is repeated four times. Again, clearly each bit in the original string is represented by four chips in the extended string.

In the bottom example a direct-sequence spread spectrum is used. In this example each '1' bit is represented by the sequence '1101' and each '0' bit is represented by '0010'. Of course different sequences could be used, particularly different length sequences could be used depending on the required coding gain. It is important that the sequences chosen possess good autocorrelation properties for proper synchronization.

FIG. 4 shows an exemplary device in accordance with the invention. This could be provided as an integrated semiconductor component commonly known as a 'System on Chip' or 'SoC' arrangement. The device 54 could be incorporated into any of a large variety of different applications—either fixed or mobile—and may be configured to transmit, receive or both.

At the heart of the device 54 is a processor 62 which communicates with a memory 64. The processor 62 also communicates with a radio receiver 58 and radio transmitter 56 which share a common antenna 60 and which allow radio signals to be received and transmitted by the device, The general design and operation of an SoC device are well known to those skilled in the art and thus further details are not necessary here.

The overall operation of a device 54 in accordance with the invention can be seen in FIG. 5. The described embodiment of the invention provides an improved digital receiver 58 for long range, low energy transmissions. By using DSSS signals, receiver sensitivity is increased, as the loss of some chips during transmission does not in general cause the loss of whole bits. This reduces the effect of transmission noise and other problems incurred in long range, low energy transmissions.

A signal is transmitted from a transmitter 56 in a device (step 66). At a later point in time, an incoming signal is received by the receiver 58 (step 68). As described with reference to FIG. 1, the receiver 60 comprises a common estimator 4 and a number of correlators 6, 8, each of which checks for a different chip sequence. The common estimator 4 is used for both despreading of the incoming signal and synchronisation of the correlators 6, 8 with the incoming signal (step 70). The correlators 6, 8 are all run off a clock in the common estimator 4. At strobe timing, they are each compared with the incoming signal (step 72) and their outputs can all be compared (step 74), allowing for the estimator to determine which correlator 6, 8 has the highest output (step 76). The highest output corresponds to the strongest correlation, and the value of the correlator 6, 8 which produced this output can be taken as the bit value at that moment in time. This value is then output from the processor 62 (step 78). By comparing the correlator outputs at regular intervals (e.g. the length of each chip pattern), a series of bits can be determined which represent the incoming signal.

Each correlator 6,8, together with the rest of the hardware, essentially constitutes a frequency offset estimator. This makes despreading very robust to carrier frequency offset and drift. This is due to two reasons. The first is that all of the correlations are carried out at the same time, so the carrier frequency cannot change while a chip pattern is being determined. The second is that due to the correlations being simultaneous, the correlators 6, 8 each experience the same carrier frequency, so are all affected by any shift in the same manner. This reduces the likelihood of a bit pattern being read erroneously.

Including a watchdog 42 with the estimator makes is possible to check whether estimator has synchronised with the start of the packet, and to escape the data collection loop if it is synchronised with the middle of the packet, reducing the chance of incorrect data collection.

The above process generates a string of bits which represent the received signal, and can then be used by the device 54 containing the radio receiver 58.

The invention claimed is:

1. A digital radio receiver adapted to receive radio signals modulated using continuous phase modulation, the digital radio receiver comprising:
    an analogue radio receiver for receiving an analogue radio signal having a carrier frequency;
    a plurality of correlators each corresponding to a different bit sequence sharing a common estimator for estimating a frequency offset between said carrier frequency and a nominal carrier frequency;
    a processor for determining which of said correlators produces a desired output signal; and
    a watchdog configured to check whether the common estimator has synchronized with a start of a packet in the signal and to switch the estimator from despreading the signal to synchronizing the correlators if it is not synchronized with the start of the packet.

2. A digital radio receiver as claimed in claim 1, wherein the desired output signal is the output signal from a given correlator that is most closely correlated against a known waveform.

3. A digital radio receiver as claimed in claim 1, wherein the radio signal comprises at least in part a direct-sequence spread spectrum signal.

4. A digital radio receiver as claimed in claim 3, wherein the direct-sequence spread spectrum signal comprises two direct-sequence spread spectrum sequences.

5. A digital radio receiver as claimed in claim 3, wherein only a payload of the packet in the signal comprises the direct-sequence spread spectrum signal.

6. A digital radio receiver as claimed in claim 1, wherein the common estimator is a data-aided joint timing and frequency offset estimator.

7. A digital radio receiver as claimed in claim 1, wherein the radio signal comprises a short-range wireless communication standard preamble.

8. A digital radio receiver as claimed in claim 1, wherein the digital radio receiver is arranged to record a timestamp when a desired output signal is measured, and a next time said signal is measured, perform a check that a predetermined number of samples have been taken since a previous signal was measured.

9. A method of operating a digital radio receiver comprising:
receiving an analogue radio signal having a carrier frequency, which is modulated using continuous phase modulation;
using a plurality of correlators each corresponding to a different bit sequence sharing a common estimator;
estimating a frequency offset between said carrier frequency and a nominal carrier frequency using the common estimator;
determining which of said correlators produces a desired output signal;
checking whether the common estimator has synchronized with a start of a packet in the signal; and
switching the common estimator from despreading the signal to synchronizing the correlators if it is not synchronized with the start of the packet.

10. A method as claimed in claim 9, wherein the desired output signal is the output signal from a given correlator that is most closely correlated with a known waveform.

11. A method as claimed in claim 9, wherein the radio signal comprises at least in part a direct-sequence spread spectrum signal.

12. A method as claimed in claim 11, comprising using two direct-sequence spread spectrum sequences to form the direct-sequence spread spectrum signal.

13. A method as claimed in claim 11, wherein only a payload of the packet in the signal comprises the direct-sequence spread spectrum signal.

14. A method as claimed in claim 9, wherein the common estimator is a data-aided joint timing and frequency offset estimator.

15. A method as claimed in claim 9, comprising using a short-range wireless standard preamble for the radio signal.

16. A method as claimed in claim 9, comprising recording a timestamp when a desired output signal is measured, and a next time said signal is measured, performing a check that a predetermined number of samples have been taken since a previous signal was measured.

17. A non-transitory computer readable medium storing instructions to cause one or more processors to control a digital radio receiver adapted to:
receive an analogue radio signal having a carrier frequency, the carrier frequency being modulated using continuous phase modulation;
monitor differing bit sequences using a plurality of correlators, each correlator corresponding to a different bit sequence and sharing a common estimator;
estimate a frequency offset between said carrier frequency and a nominal carrier frequency using the common estimator;
logically determine which of said correlators produces a desired output signal;
determine whether the common estimator has synchronized with a start of a packet in the signal; and
switch the common estimator from despreading the signal to synchronizing the correlators if it is not synchronized with the start of the packet.

18. The non-transitory computer readable medium as claimed in claim 17, wherein the desired output signal is the output signal from a given correlator that is most similar to a known waveform.

19. The non-transitory computer-readable medium as claimed in claim 17, wherein the radio signal comprises at least in part a direct-sequence spread spectrum signal.

20. The non-transitory computer readable medium as claimed in claim 19, adapted to use two direct-sequence spread spectrum sequences.

21. The non-transitory computer readable medium as claimed in claim 19, wherein only the packet in the signal comprises the direct-sequence spread spectrum signal.

22. The non-transitory computer readable medium as claimed in claim 17, wherein the common estimator is a data-aided joint timing and frequency offset estimator.

23. The non-transitory computer readable medium as claimed in claim 17, adapted to use a short-range, wireless standard preamble for the radio signal.

24. The non-transitory computer readable medium as claimed in claim 17, adapted to record a timestamp when a desired output signal is measured, and a next time said signal is measured, perform a check that a predetermined number of samples have been taken since a previous signal was measured.

* * * * *